UNITED STATES PATENT OFFICE.

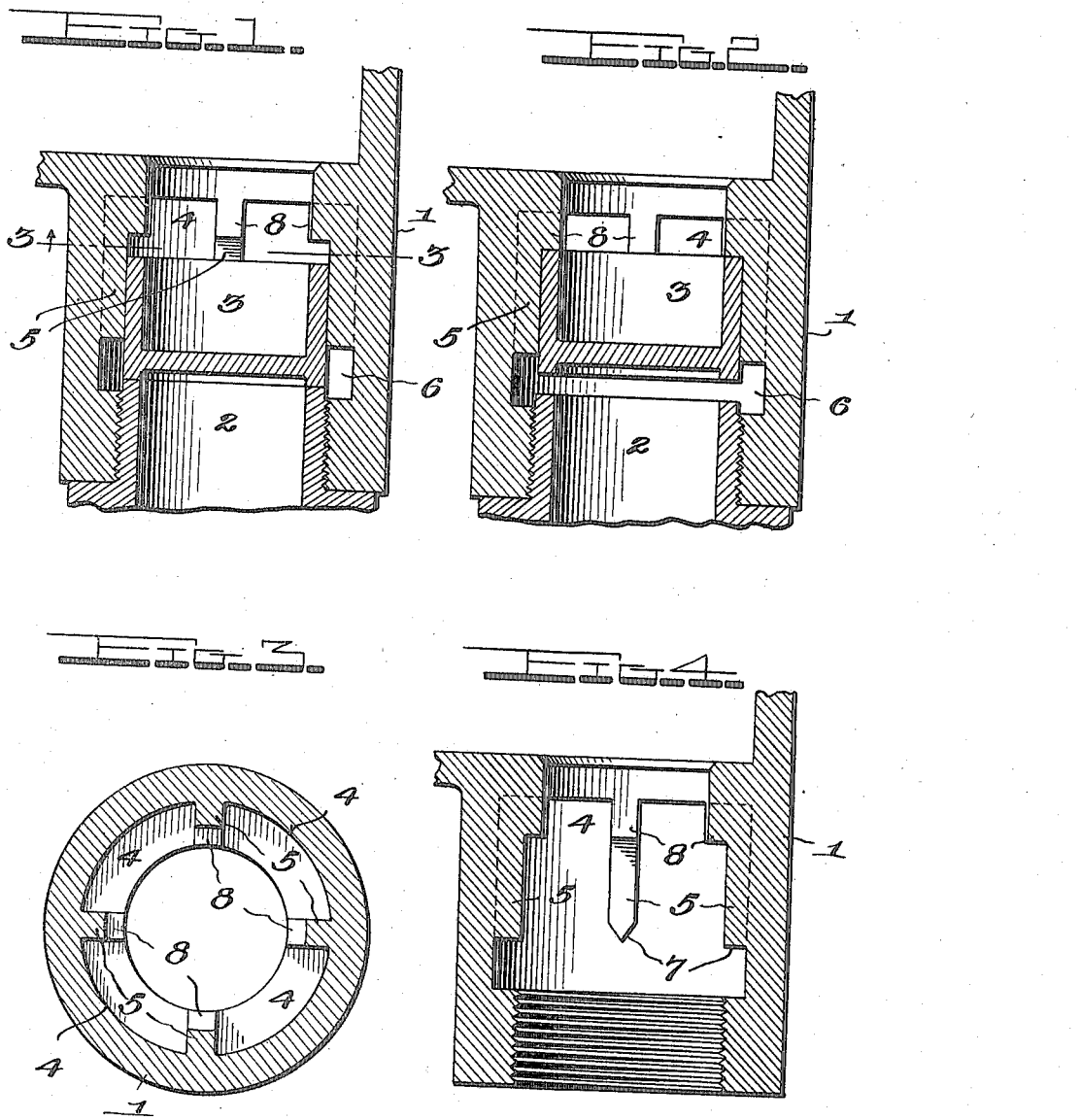

MARTIN A. ENGER, OF WILLMAR, MINNESOTA, ASSIGNOR OF ONE-HALF TO RUSSELL SPICER, OF WILLMAR, MINNESOTA.

BOILER-CHECK.

1,180,989.     Specification of Letters Patent.     Patented Apr. 25, 1916.

Application filed March 23, 1914. Serial No. 826,746.

*To all whom it may concern:*

Be it known that I, MARTIN A. ENGER, a citizen of the United States, residing at Willmar, in the county of Kandiyohi, in the State of Minnesota, have invented new and useful Improvements in Boiler-Checks, of which the following is a specification.

My invention relates to improvements in boiler checks, and has as an object to provide an improved check valve in which scales and other foreign matter in the water cannot lodge on the valve seat and thereby prevent the seating of the valve.

It is a further object of my invention to provide a check valve which may be easily removed and which is capable of ready adjustment.

It is also an object of my invention to provide a check valve which is durable, efficient and comparatively simple in construction, and through which fluid may readily pass.

I obtain the above and other objects by the structure disclosed in the accompanying drawings, in which,—

Figure 1 is a vertical sectional view of my improved check valve with the valve seated. Fig. 2 is a vertical sectional view of the same with the valve lifted. Fig. 3 is a horizontal sectional view on line 3—3 of Fig. 1. Fig. 4 is a vertical sectional view of the valve chamber with the valve and valve seat removed.

Similar letters refer to similar parts throughout the several views.

My improved check valve is composed substantially of a casing or valve chamber 1, a valve seat 2, and a valve 3. The valve casing 1 comprises a cylindrical shell having a central opening therethrough, the diameter of the central opening being somewhat enlarged for a portion of the length of the opening and intermediate the ends of the casing whereby to provide a counterbore 4. Within the enlarged bore 4 and formed integral with the walls of the chamber 1 are diametrically disposed guides 5 which extend downwardly toward the intake end of the valve but which terminate some distance above the lower edge or point of intake of the enlarged bore 4, thereby providing around the valve seat an uninterrupted water-space 6.

The lower ends of the guides 5 are beveled or V-shaped as at 7, so as to facilitate the passage of the water through the valve. At the upper ends of the guides are inwardly extending integral stops 8 which are adapted to limit the upward movement of the valve.

The casing 1 at the inlet end thereof is threaded to receive a correspondingly threaded valve seat 2, the valve seat comprising a cylindrical member upon the inner end of which the valve 3 is adapted to rest. The inner end of the member 2 is adapted to extend slightly into the enlarged bore 4, so as to be elevated above the lower edge of the latter. It will be noted that as the guides do not extend throughout the entire length of the enlarged bore, but terminate somewhat short of the lower edge thereof, and since the inner end of the member 2 extends slightly into the enlarged bore, the water space 6 extends for some distance above and below the point of intake between the valve seat and the valve 3 and to the wall of the valve chamber, and that this water space is uninterrupted by any guides, stops, or other parts of the boiler check. Therefore, scales or other matter in the water pass freely beyond the valve seat into the uninterrupted water space 6 without lodging on the valve seat and thus preventing the valve from seating itself.

In operation, the water under pressure passes upward through the casing, raises the valve 3 and passes between the valve and the valve seat into the uninterrupted water-space 6, and upward through that portion of the enlarged bore 4 about the valve 3, and thence over the valve and out through the outlet of the casing.

In boiler checks where the valve guides are placed below the valve seat the principle of this improvement can be applied by cutting away the outer edges of the valve guides at the point of intake to an extent coextensive with the water space when the valve is lifted.

It is, of course, obvious that my invention is susceptible of various modifications and changes within the spirit of my invention, without departing from the scope of the following claims.

What I claim as new is,—

1. A check valve comprising a casing having a through opening and a counterbore intermediate the ends of the opening, a valve seat fitted in one end of the opening and projecting at its inner end into the counterbore to provide a free passage about the inner end of said valve seat, a valve in the opening in line with said seat, and guides in the counterbore for said valve terminating at a point above the lower or seating end of the valve when the latter is fully open.

2. A check valve comprising a casing having an opening therethrough and a counterbore between the ends of the opening, a valve in the counterbore, and spaced-apart guides in the counterbore for said valve terminating at a point above the lower or seating end of the valve when the latter is fully open, said guides having beveled ends facing the valve seat to deflect the fluid about the guides and reduce the resistance of the guides to the passage of the fluid through the casing.

3. A check valve comprising a cylindrical casing having a through opening and a counterbore intermediate the ends of the opening, a valve seat in threaded engagement with and adapted for adjustment in one end of the opening and projecting at its inner end into the counterbore to provide a free passage about the inner end of said valve seat, a valve in the opening in line with said seat, spaced-apart guides in the counterbore integral with said casing and terminating at a point above the lower or seating edge of the valve when the latter is fully open, and stops at the upper end of said guides and integral therewith adapted to limit the movement of the valve.

MARTIN A. ENGER.

Witnesses:
OSCAR C. RONKEN,
REUBEN W. PALMER.

Copies of this patent may be obtained for five cents each, by addressing the "Commissioner of Patents, Washington, D. C."